(12) United States Patent
Wang et al.

(10) Patent No.: US 8,944,663 B2
(45) Date of Patent: Feb. 3, 2015

(54) LIGHT GUIDE PLATE AND BACKLIGHT MODULE HAVING V-CUT STRUCTURE

(75) Inventors: Chiung-Han Wang, Hsin-Chu (TW); Jing-Huan Liao, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 1318 days.

(21) Appl. No.: 12/492,354

(22) Filed: Jun. 26, 2009

(65) Prior Publication Data
US 2010/0182802 A1  Jul. 22, 2010

(30) Foreign Application Priority Data

Jan. 22, 2009 (TW) .............................. 98102546 A

(51) Int. Cl.
*F21V 7/04* (2006.01)
*F21V 8/00* (2006.01)

(52) U.S. Cl.
CPC ............ *G02B 6/0038* (2013.01); *G02B 6/0053* (2013.01); *G05B 6/0051* (2013.01)
USPC ........... 362/620; 362/615; 362/626; 362/627; 362/97.1

(58) Field of Classification Search
USPC ........................................ 362/600–630, 97.1
See application file for complete search history.

(56) References Cited

U.S. PATENT DOCUMENTS 5,797,668 A * 8/1998 Kojima et al. ................ 362/618
8,098,347 B2 * 1/2012 Brott et al. ...................... 349/62
2005/0117370 A1 * 6/2005 Kawashima et al. .......... 362/615
2006/0104093 A1 * 5/2006 Feng et al. ..................... 362/626
2007/0127268 A1 * 6/2007 Chen .............................. 362/630
2007/0189033 A1 * 8/2007 Watanabe et al. ............. 362/606
2008/0232137 A1 * 9/2008 Fukuda et al. ................ 362/620
2010/0110338 A1 * 5/2010 Chang et al. .................... 349/65

FOREIGN PATENT DOCUMENTS

JP      2001-195915      7/2001
TW       2005-23503      7/2005
(Continued)

OTHER PUBLICATIONS

English language translation of abstract and pertinent parts of JP 2001-195915 (published Jul. 19, 2001).
(Continued)

*Primary Examiner* — Anh Mai
*Assistant Examiner* — Jessica M Apenteng
(74) *Attorney, Agent, or Firm* — McClure, Qualey & Rodack, LLP

(57) ABSTRACT

A light guide plate having a V-cut structure and a backlight module are disclosed. The light guide plate comprises straight-striped V-cut structure sets and a base plate having a light-entering side. The straight-striped V-cut structure sets are formed on a surface of the base plate adjacent to the light-entering side, wherein each straight-striped V-cut structure set is composed of at least one V-cut element, each V-cut element having a first base angle and a second base angle formed between its respective two inclined surfaces and a horizontal surface of the base plate. The first base angle is located closer to the light-entering side than the second base angle is, and is smaller than or equal to the second base angle. The straight-striped V-cut structure sets have a plurality of second average angle values which are gradually decreased from the light-entering side to a central position of the base plate.

38 Claims, 9 Drawing Sheets

(56) References Cited

FOREIGN PATENT DOCUMENTS

| TW | M311911 | 5/2007 |
| TW | I285721 | 8/2007 |
| TW | M321111 | 10/2007 |

OTHER PUBLICATIONS

English language translation of abstract of TW I285721.
English language translation of abstract of TW M311911.
English language translation of abstract of TW M321111.
English language translation of abstract of TW 2005-23503.

* cited by examiner

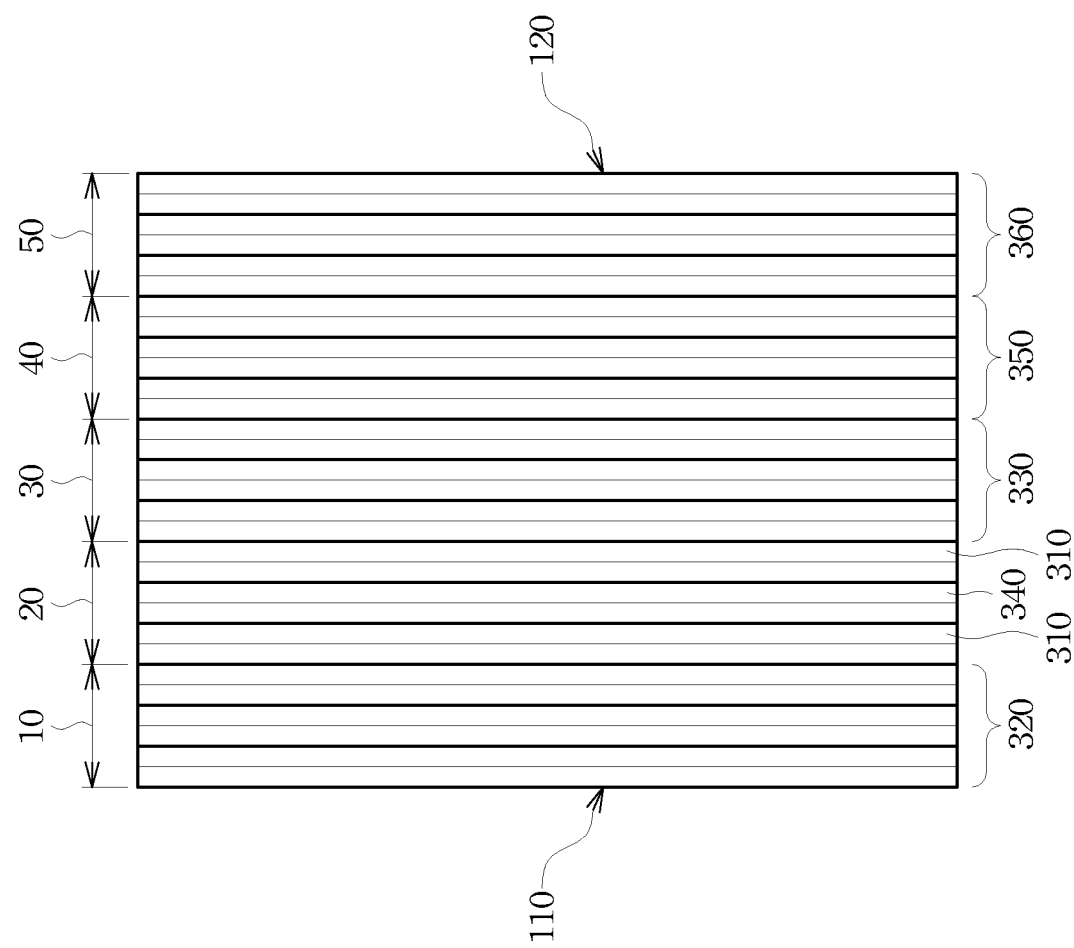

LIGHT GUIDE PLATE AND BACKLIGHT MODULE HAVING V-CUT STRUCTURE

RELATED APPLICATIONS

This application claims priority to Taiwan Application Serial Number 98102546, filed Jan. 22, 2009, which is herein incorporated by reference.

BACKGROUND

1. Field of Invention

The present invention relates to a light guide plate and a backlight module. More particularly, the present invention relates to a light guide plate having a V-cut structure and a backlight module containing the light guide plate.

2. Description of Related Art

A backlight module is one of the key components for a liquid crystal display (LCD) panel. Since liquid crystals themselves do not emit light, the backlight module is required for providing a light source, whereby the LCD panel can show a normal image of uniform brightness. The backlight module generally comprises a light source and a light guide plate and several optical films disposed above the light guide plate, such as a diffuser and a brightness enhancement film (BEF) etc., wherein the light guide plate is used to lead the light emitted by the light source to the optical films, and then the optical films are used to redistribute the light in more directions so that the light emitted can be distributed more uniformly.

Since a light guide plate with microstructures has a more concentrated light pattern than a flat light guide plate, conventional skills often implement the microstructures on the light guide plate to promote the lightness of the light guide plate. A conventional light guide plate with microstructures has an incident surface, an emitting surface and a reflecting surface, and the reflecting surface has the V-cut microstructures of the same type, wherein each of the V-cut microstructures has a main angle. The convention skill generally adjusts the depth or pitch of the V-cut microstructure to control light emitting amount, thereby satisfying the requirement of light uniformity. However, when light is transmitted within the conventional light guide plate with microstructures, a front light beam just entering the light guide plate will form an end light beam after being transmitted, and the light pattern of the end light beam will be different from that of the front light beam, thus causing light pattern variations to occur on the front, middle and end zones of the light guide plate, i.e. the light incident angles from the respective zones to an optical film has quite a lot of variations. On the other hand, since the optical film above the light guide plate is formed from uniform material, the light incident angles to the optical film are required to be as close as possible. Therefore, the light emitting patterns of the conventional light guide plate can hardly generate consistent light incident angles on the front, middle and end zones of the light guide plate, and thus the requirements of optimum light incident angles to the optical film cannot be satisfied.

SUMMARY

Hence, one aspect of the present invention is to provide a light guide plate having a V-cut structure and a backlight module containing the light guide plate, thereby improving the phenomenon of inconsistent light patterns on the front, middle and end zones of the conventional light guide plate.

In accordance with one embodiment, a light guide plate having a V-cut structure comprises a base plate and a plurality of straight-striped V-cut structure sets. The base plate has a first side and a second side opposite to the first side. The straight-striped V-cut structure sets are formed on a surface of the base plate adjacent to the first side, wherein each of the straight-striped V-cut structure sets is composed of at least one V-cut element. Each V-cut element has a first base angle and a second base angle formed between its respective two inclined surfaces and a horizontal surface of the base plate, wherein the first base angle is located closer to the first side than the second base angle is, and the first base angle is smaller than or equal to the second base angle. Each straight-striped V-cut structure sets has a first average angle value and a second average angle value, wherein the first average angle value is an averaged value of the first base angle(s) of the V-cut element(s) in one straight-striped V-cut structure set, and the second average angle value is an averaged value of the second base angle(s) of the V-cut element(s) in one straight-striped V-cut structure set, and the second average angle values of the straight-striped V-cut structure sets are gradually decreased from the first side to a central position of the base plate.

According to another embodiment, each straight-striped V-cut structure set has a smaller average angle value, wherein the smaller average angle value is the minimum value between the first average angle and the second average angle of the V-cut element in one straight-striped V-cut structure set. The straight-striped V-cut structure sets comprises a first V-cut structure set and a second V-cut structure set. The first V-cut structure set is parallel to the first side, and the second V-cut structure set is located between the first side and the first V-cut structure set, wherein the smaller average angle value of the first V-cut structure set is less than the smaller average angle value of the second V-cut structure set.

According to another embodiment of the present invention, each straight-striped V-cut structure set has a larger average angle value, wherein the larger average angle value is the maximum value between the first average angle and the second average angle of the V-cut element in one straight-striped V-cut structure set, wherein the larger average angle value of the first V-cut structure set is less than the larger average angle value of the second V-cut structure set.

According to another embodiment of the present invention, a backlight module comprises the aforementioned light guide plate having a V-cut structure, an optical film and a first light source, wherein the optical film is disposed above a light-emitting surface of the light guide plate, and the first light source is disposed adjacent to the first side of the light guide plate.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 3 is a schematic diagram showing straight-striped V-cut structure sets in accordance with another embodiment.

DESCRIPTION OF THE PREFERRED EMBODIMENTS

Figure 1A:
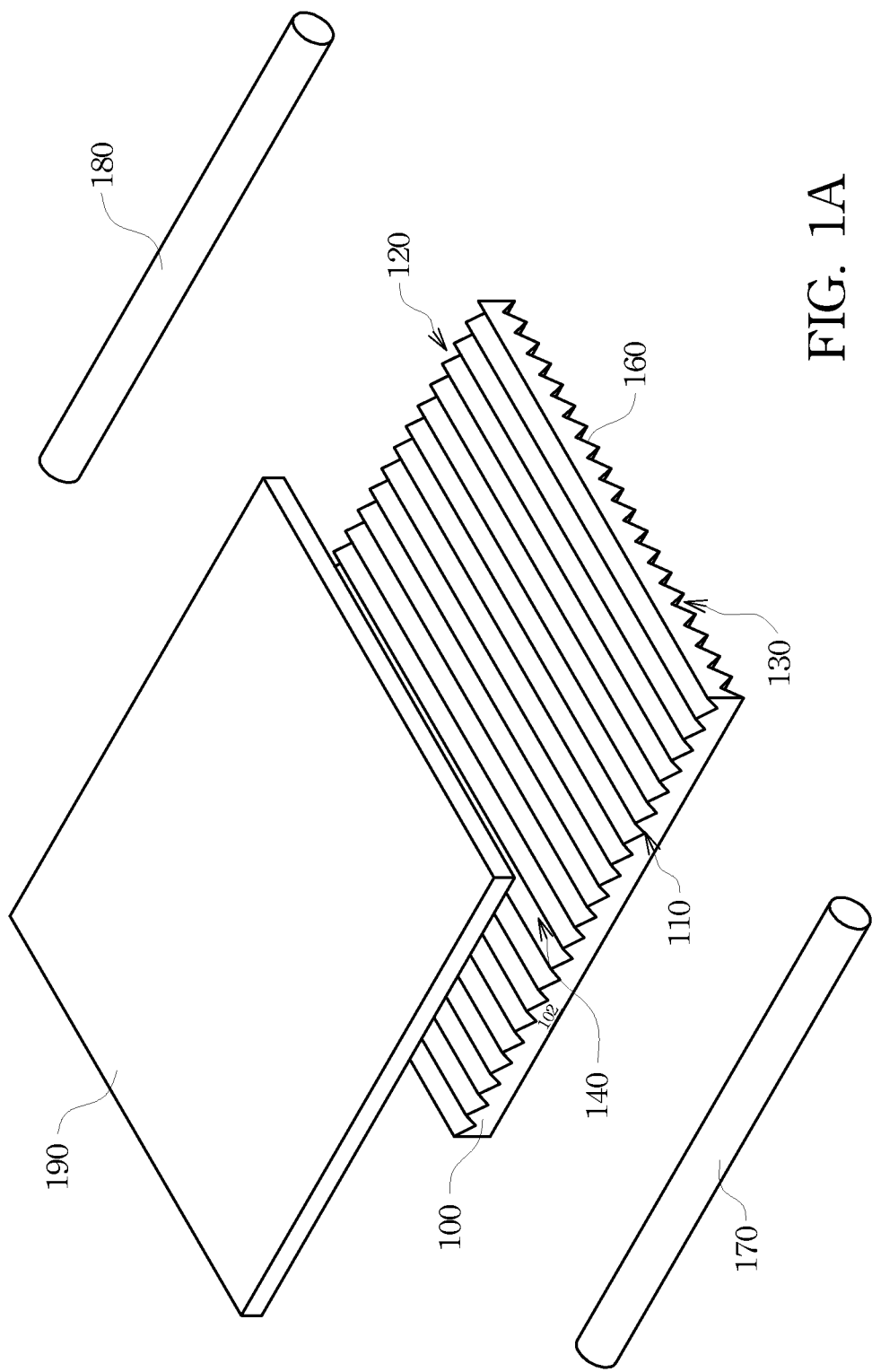
FIG. 1A is a schematic diagram showing a backlight module of the present invention.
Figure 1B:
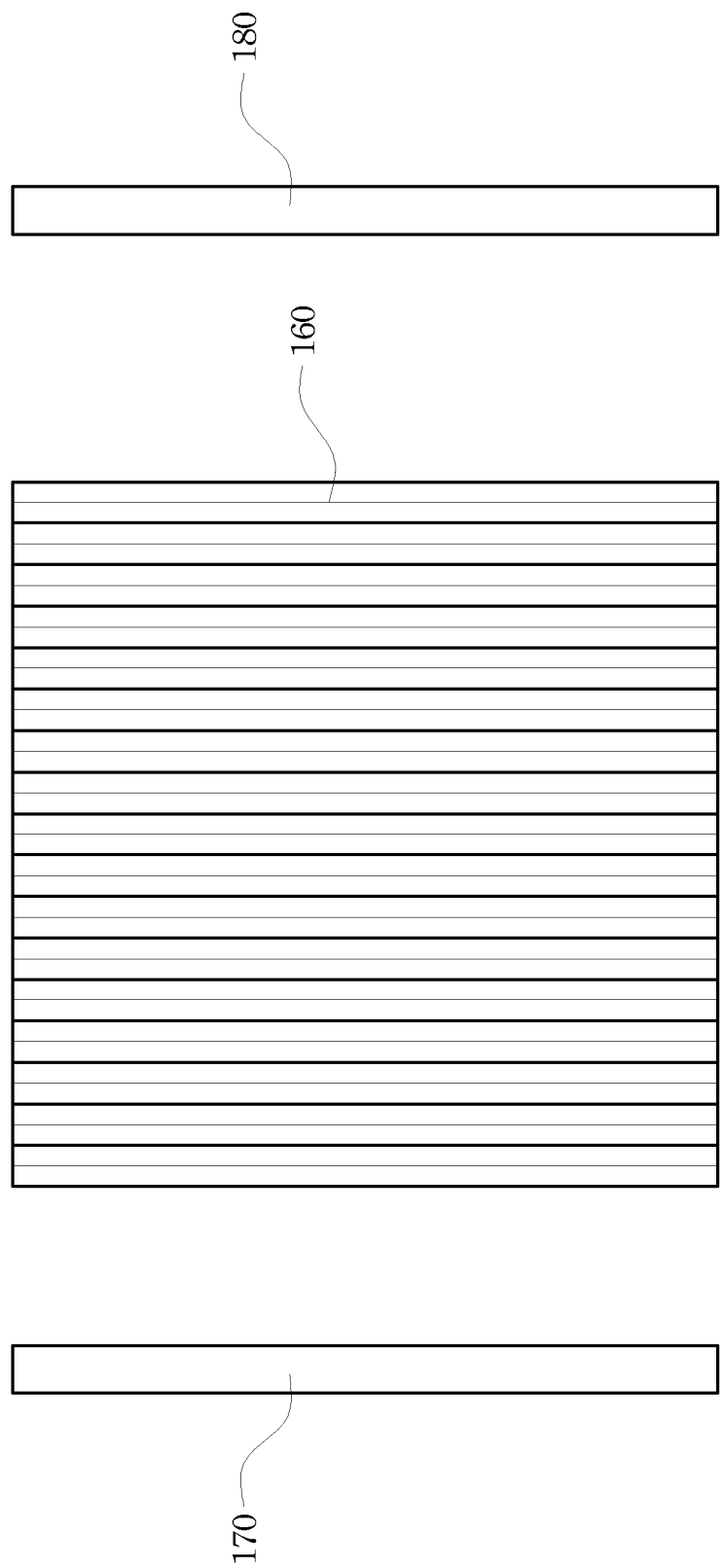
FIG. 1B is a schematic bottom view showing the backlight module of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1A and FIG. 1, FIG. 1A and FIG. 1 are respective schematic diagram and schematic bottom view showing a backlight module of the present invention. A backlight module comprises a light a light guide plate 100 having a V-cut structure, an optical film 190, a first light source 170 and a second light source 180, wherein the light guide plate 100 has a first side 110, a second side 120 opposite to the first side 110, and two surfaces 130 and 140 adjacent to the first side 110. The surface 130 is a light-reflecting surface, and the surface 140 is a light-emitting surface of the backlight module. The backlight module shown in FIG. 1 is a dual-light structure, and the first light source 170 and the second light source 180 are disposed adjacent to the first side 110 and the second side 120 of the light guide plate 100 respectively. Besides, the backlight module of the present invention also can be a single-light structure in which only the first light source 170 is disposed and the second light source 180 is not. The light a light guide plate 100 having a V-cut structure comprises a base plate 102 and a plurality of straight-striped V-cut structure sets (not labeled), wherein the base plate 102 can be a wedge plate or a planar plate. The straight-striped V-cut structure sets are formed on the surface 130 of the base plate 102, and also can be optionally formed on the surface 140 of the base plate 102. As shown in FIG. 1A, the V-cut structure on the surface 130 and that on the surface 140 have different extension directions. Each of the straight-striped V-cut structure sets is composed of at least one V-cut element 160. The structure of the V-cut element 160 is described as follows.

Figure 1C:
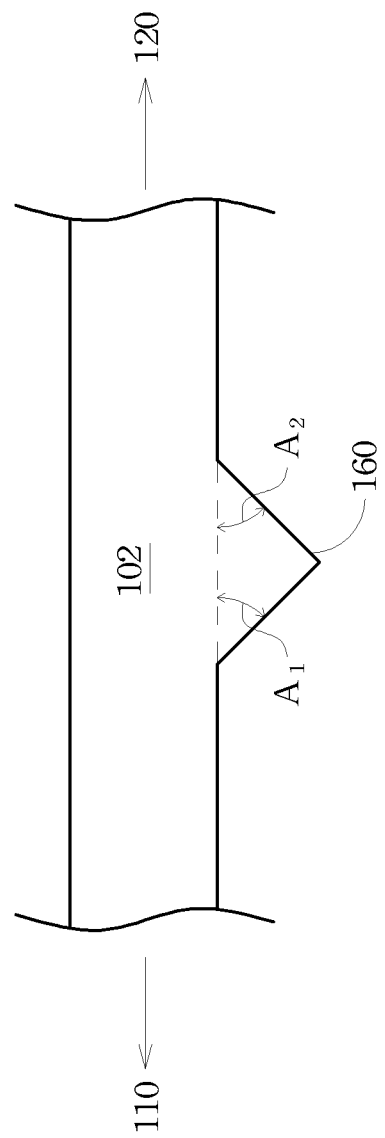
FIG. 1C is a schematic diagram showing a V-cut element of the present invention.
Figure 1D:
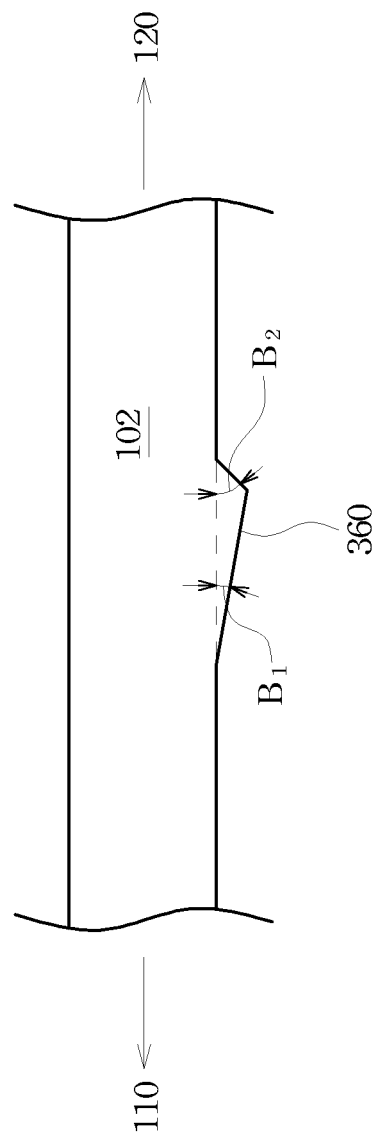
FIG. 1D is a schematic diagram showing another V-cut element of the present invention.

Referring to FIG. 1A and FIG. 1C, FIG. 1C is a schematic diagram showing a V-cut element of the present invention, wherein the backlight module is a dual-light structure. There are a first base angle $A_1$ and a second base angle $A_2$ respectively between two inclined surfaces of each V-cut element 160 and a horizontal surface of the base plate 102, wherein the first base angle $A_1$ is located closer to the first side 110 than the second base angle $A_2$ is, and the first base angle $A_1$ is equal to the second base angle $A_2$. The first base angle $A_1$ and the second base angle $A_2$ range from about 30 degrees to about 45 degrees. Referring to FIG. 1A and FIG. 1D, FIG. 1D is a schematic diagram showing another V-cut element of the present invention, wherein the backlight module is a single-light structure (i.e., only the first light source 170 is disposed and the second light source 180 is not). Each V-cut element 160 has a first base angle $B_1$ and a second base angle $B_2$ formed between its respective two inclined surfaces and a horizontal surface of the base plate 102, and the first base angle $B_1$ is less than the second base angle $B_2$. The first base angle $B_1$ ranges from about 2 degrees to about 8 degrees, and the second base angle $B_2$ ranges from about 30 degrees to about 45 degrees. The present invention is mainly to mix the V-cut elements with different base angles on different zones of the base plate 102, so as to generate the light patterns having quite consistent light-emitting angles on the respective zones, thus satisfying the requirements of optimum light incident angles to the optical film 190.

Figure 1E:
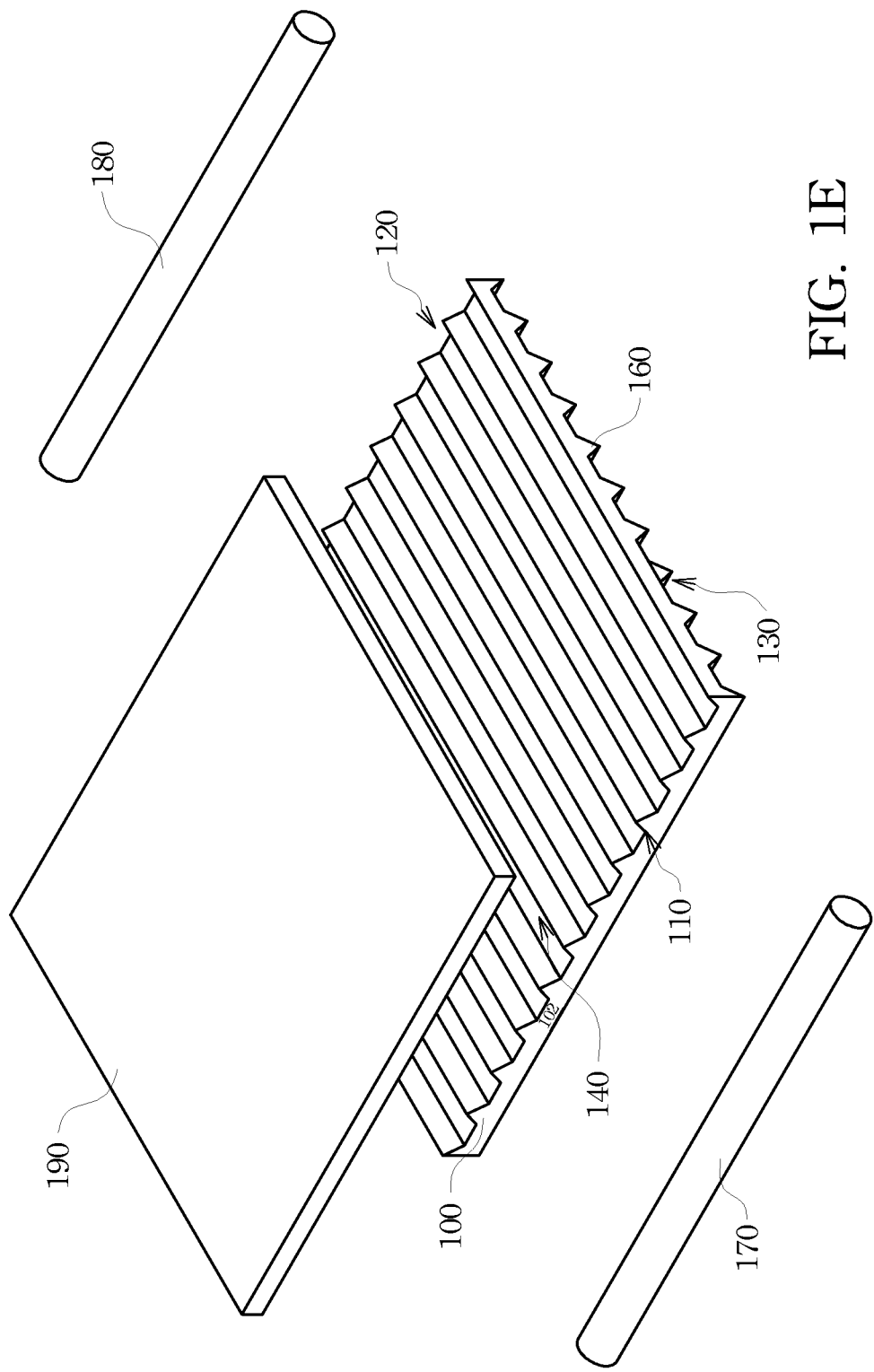
FIG. 1E is a schematic diagram showing another backlight module of the present invention.

As shown in FIG. 1A, the V-cut structure is a continuous structure of consecutive V-cut elements 160, i.e. there is no interruption between every two adjacent V-cut elements. However, referring to FIG. 1C, FIG. 1D and FIG. 1E, FIG. 1E is a schematic diagram showing another backlight module of the present invention. The V-cut structure also can be a discontinuous structure of inconsecutive V-cut elements 160 as shown in FIG. 1E, i.e., there are flat surfaces around each V-cut element as shown in FIG. 1C or FIG. 1D. Therefore, the present invention is applicable to the continuous or discontinuous V-cut structure.

Hereinafter, the design principles for mixing the V-cut elements with different base angles on different zones of the base plate 102 are explained.

Design Principle I

This design principle is based on the changes of the average values of the second base angles.

Figure 2A:
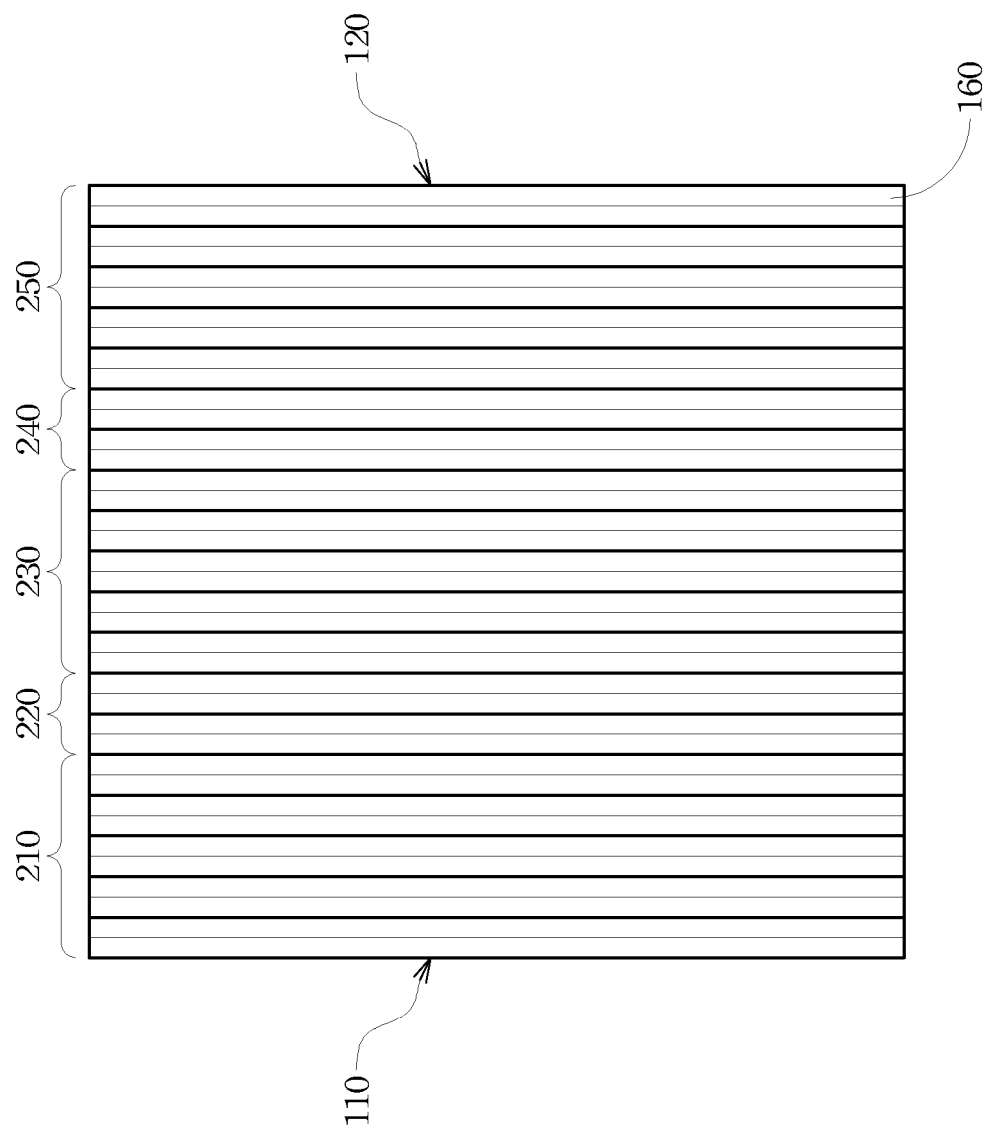
FIG. 2A is a schematic diagram showing straight-striped V-cut structure sets in accordance with one embodiment.

Referring to FIG. 2A, FIG. 2A is a schematic diagram showing straight-striped V-cut structure sets in accordance with one embodiment, wherein a plurality of straight-striped V-cut structure sets 210, 220, 230, 240 and 250 are arranged on the base plate 102 sequentially from the first side 110 to the second side 120. Each of the straight-striped V-cut structure sets 210, 220, 230, 240 and 250 has a first average angle value and a second average angle value, wherein the first average angle value is an averaged value of the first base angles of the V-cut elements 160 in one straight-striped V-cut structure set 210, 220, 230, 240 or 250, and the second average angle value is an averaged value of the second base angles of the V-cut elements 160 in one straight-striped V-cut structure set 210, 220, 230, 240 or 250. The V-cut elements 160 shown in FIG. 2A is merely shown as an example for explanation, and in fact, each of the straight-striped V-cut structure set 210, 220, 230, 240 and 250 can be composed of one or more V-cut elements 160. The second average angle values of the straight-striped V-cut structure sets 210, 220, 230, 240 and 250 are gradually decreased from the first side 110 to a central position (the position at which the straight-striped V-cut structure set 230 is located) of the base plate 102, i.e., the second average angle value of the straight-striped V-cut structure set 210>the second average angle value of the straight-striped V-cut structure set 220>the second average angle value of the straight-striped V-cut structure set 230.

Figure 2B:
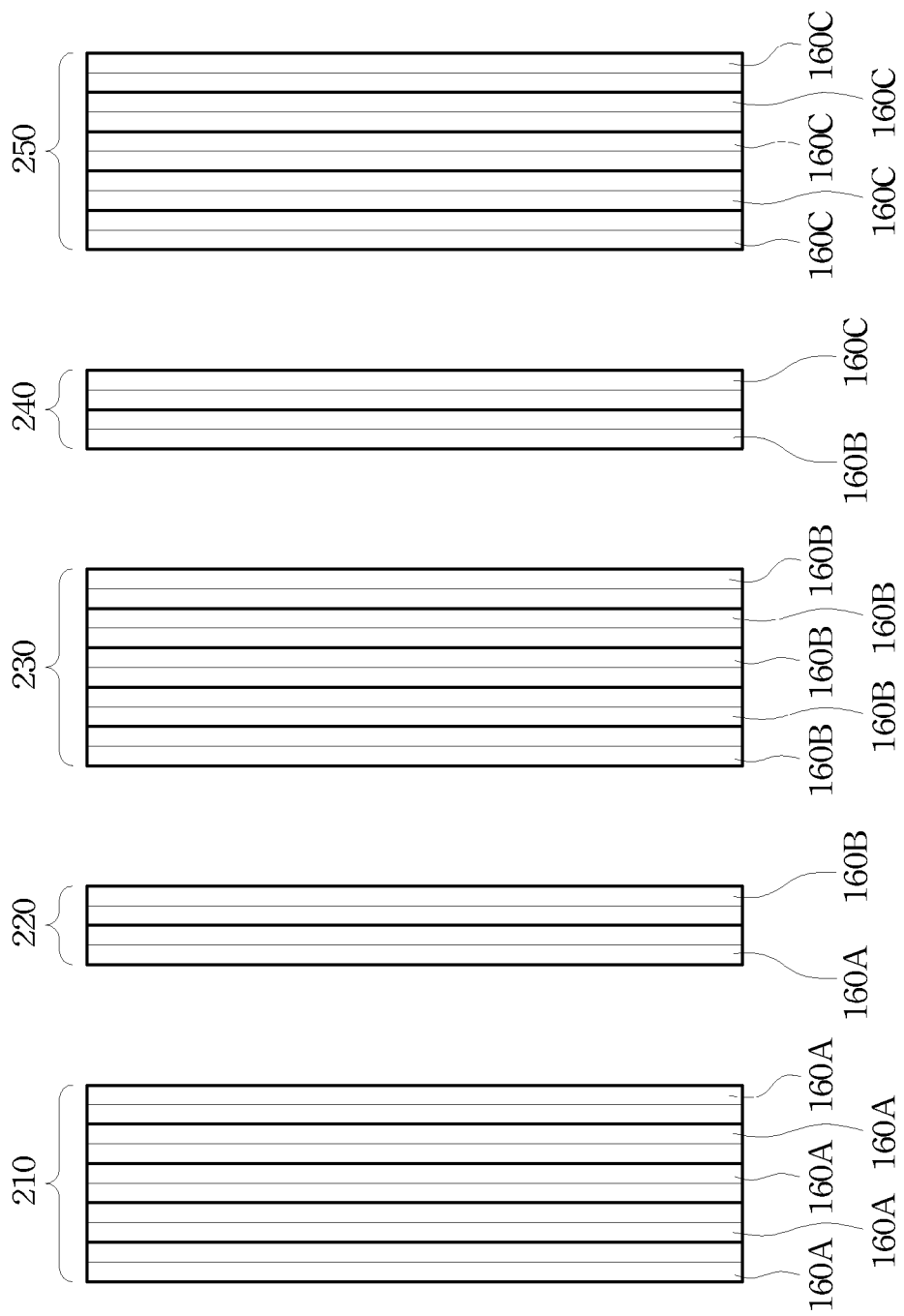
FIG. 2B is a schematic diagram showing straight-striped V-cut structure sets in accordance with another embodiment.

Referring to FIG. 2B, FIG. 2B is a schematic diagram showing straight-striped V-cut structure sets in accordance with another embodiment. In this embodiment, a method of mixing different types of V-cut elements is used to enable this design principle, and the different types of V-cut elements stand for the V-cut elements with different first base angles and/or second base angles, such as a first V-cut element 160A and a second V-cut element 160B. As shown in FIG. 2B, the straight-striped V-cut structure set 210 is composed of at least one first V-cut element 160A; the straight-striped V-cut structure set 230 is composed of at least one second V-cut element 160B; the straight-striped V-cut structure set 250 is composed of at least one third V-cut element 160C; the straight-striped V-cut structure set 220 is formed by mixing the first V-cut element 160A and the second V-cut element 160B; and the straight-striped V-cut structure set 240 is formed by mixing the second V-cut element 160B and the third V-cut element 160C. In this embodiment, the method of mixing different types of V-cut elements can be such as alternately disposing different types of V-cut elements, for example, the V-cut element 160A/the V-cut element 160B/the V-cut element 160A.

This design principle will be varied in accordance with the type of the backlight module which is a dual-light structure or a single-light structure.

Dual-Light Structure

When the first side 110 is a first light-entering side and the second side 120 is a second light-entering side of the light guide plate 100, the backlight module is a dual-light structure, wherein the first average angle value is the same as the second average angle value, and thus the second average angle value is used herein for explanation. In the dual-light structure, the second average angle values of the straight-striped V-cut structure sets 210, 220, 230, 240 and 250 are gradually increased from the central position to the second side 120 of the base plate 102, i.e., the second average angle value of the straight-striped V-cut structure set 230<the second average angle value of the straight-striped V-cut structure set 240<the second average angle value of the straight-striped V-cut structure set 250. For example, as shown in Table 1, the second average angle values are gradually decreased from the straight-striped V-cut structure set 210 (the first side 110) to the straight-striped V-cut structure set 230 (the central position), and then is gradually increased to the straight-striped V-cut structure set 250 (the second side 120).

TABLE 1

| | straight-striped V-cut structure set 210 | straight-striped V-cut structure set 230 | straight-striped V-cut structure set 250 |
|---|---|---|---|
| first average angle value/second average angle value | 45 degrees/ 45 degrees | 43 degrees/ 43 degrees | 45 degrees/ 45 degrees |

Referring to FIG. 2B and Table 1, the straight-striped V-cut structure set 210 is composed of the first V-cut elements 160A (45 degrees/45 degrees); the straight-striped V-cut structure set 230 is composed of the second V-cut elements 160B (43 degrees/43 degrees); the straight-striped V-cut structure set 250 is composed of the third V-cut elements 160C (45 degrees/45 degrees); the straight-striped V-cut structure set 220 is formed by mixing the first V-cut element 160A and the second V-cut element 160B, and thus has 44 degrees (the first average angle value)/44 degrees (the second average angle value); and the straight-striped V-cut structure set 240 is formed by mixing the second V-cut element 160B and the third V-cut element 160C, and thus has 44 degrees (the first average angle value)/44 degrees (the second average angle value), wherein the first V-cut element 160A and the third V-cut element 160C are of the same type.

Single-Light Structure

When the first side 110 is the only one light-entering side of the light guide plate 100, i.e., the backlight module is a single-light structure, the second average angle values of the straight-striped V-cut structure sets 210, 220, 230, 240 and 250 are gradually increased from the central position to the second side 120 of the base plate 102, as shown in Table 2.

TABLE 2

| | straight-striped V-cut structure set 210 | straight-striped V-cut structure set 230 | straight-striped V-cut structure set 250 |
|---|---|---|---|
| first average angle value/second average angle value | 5 degrees/ 40 degrees | 5 degrees/ 30 degrees | 2 degrees/ 36 degrees |

In Table 2, the first average angle values are the same from the straight-striped V-cut structure set 210 (the first side 110) to the straight-striped V-cut structure set 230 (the central position), and then are gradually decreased from the central position to the straight-striped V-cut structure set 250 (the second side 120). The second average angle values are gradually decreased from the straight-striped V-cut structure set 210 (the first side 110) to the straight-striped V-cut structure set 230 (the central position), and then is gradually increased to the straight-striped V-cut structure set 250 (the second side 120).

Referring to FIG. 2B and Table 2, the straight-striped V-cut structure set 210 is composed of the first V-cut elements 160A (5 degrees/40 degrees); the straight-striped V-cut structure set 230 is composed of the second V-cut elements 160B (5 degrees/30 degrees); the straight-striped V-cut structure set 250 is composed of the third V-cut elements 160C (2 degrees/36 degrees); the straight-striped V-cut structure set 220 is formed by mixing the first V-cut element 160A and the second V-cut element 160B, and thus has 5 degrees (the first average angle value)/35 degrees (the second average angle value); and the straight-striped V-cut structure set 240 is formed by mixing the second V-cut element 160B and the third V-cut element 160C, and thus has 3.5 degrees (the first average angle value)/33 degrees (the second average angle value).

Further, when the backlight module is a single-light structure, the straight-striped V-cut structure sets 210, 220, 230, 240 and 250 may have the same first average angle value, and the second average angle values may be gradually decreased from the central position to the second side 120 of the base plate 102, as shown in Table 3.

TABLE 3

| | straight-striped V-cut structure set 210 | straight-striped V-cut structure set 230 | straight-striped V-cut structure set 250 |
|---|---|---|---|
| first average angle value/second average angle value | 3.5 degrees/ 40 degrees | 3.5 degrees/ 38 degrees | 3.5 degrees/ 36 degrees |

In Table 3, the first average angle values are the same, and the second average angle values are gradually decreased from the straight-striped V-cut structure set 210 (the first side 110) to the straight-striped V-cut structure set 230 (the central position), and further are gradually decreased to the straight-striped V-cut structure set 250 (the second side 120).

Referring to FIG. 2B and Table 2, the straight-striped V-cut structure set 210 is composed of the first V-cut elements 160A (3.5 degrees/40 degrees); the straight-striped V-cut structure set 230 is composed of the second V-cut elements 160B (3.5 degrees/38 degrees); the straight-striped V-cut structure set 250 is composed of the third V-cut elements 160C (3.5 degrees/36 degrees); the straight-striped V-cut structure set 220 is formed by mixing the first V-cut element 160A and the second V-cut element 160B, and thus has 3.5 degrees (the first average angle value)/39 degrees (the second average angle value); and the straight-striped V-cut structure set 240 is formed by mixing the second V-cut element 160B and the third V-cut element 160C, and thus has 3.5 degrees (the first average angle value)/37 degrees (the second average angle value).

Design Principle II

This design principle is based on the changes of the smaller average angle values of the straight-striped V-cut structure sets, wherein the smaller average angle value is the minimum value between the first average angle and the second average angle of the V-cut element in one straight-striped V-cut structure set. For example, if the first average angle value and the second average angle value of a certain straight-striped V-cut structure set are 3.5 degrees and 40 degrees, then the smaller average angle value is 3.5 degrees.

Referring to FIG. 3, FIG. 3 is a schematic diagram showing straight-striped V-cut structure sets in accordance with another embodiment. As shown in FIG. 3, the straight-striped V-cut structure sets comprises a first V-cut structure set 310, a second V-cut structure set 320, a third V-cut structure set 330, a fourth V-cut structure set 340, a fifth V-cut structure set 350 and a sixth V-cut structure set 360. The first V-cut structure set 310 is parallel to the first side 110, and the second V-cut structure set 320 is located between the first side 110 and the first V-cut structure set 310, wherein the smaller average angle value of the first V-cut structure set 310 is less than the smaller average angle value of the second V-cut structure set 320. The first V-cut structure set 310 is located between the third V-cut structure set 330 and the second V-cut structure set 320, wherein the smaller average angle value of the first V-cut structure set 310 is less than the smaller average angle value of the third V-cut structure set 330.

In this embodiment, the base plate has a first parallel zone 10, a first mix zone 20, a second parallel zone 30, a second mix zone 40 and a third parallel zone 50. The first parallel zone 10 is located between the first side 110 and the first mix zone 20, and the second V-cut structure set 320 is disposed in the first parallel zone 10, and the first V-cut structure set 310 is disposed in the first mix zone 20, the fourth V-cut structure set 340 is disposed in the first mix zone 20, wherein the smaller average angle value of the fourth V-cut structure set 340 is less than the smaller average angle value of the first V-cut structure set 310, and the fourth V-cut structure set 340 and the first V-cut structure set 310 are alternately disposed. The third V-cut structure set 330 is disposed in the second parallel zone 30, and the smaller average angle value of the third V-cut structure set 330 is less than the smaller average angle value of the first V-cut structure set 310 and the smaller average angle value of the fourth V-cut structure set 340. The second mix zone 40 is located between the second side 120 and the second parallel zone 30, and the fifth V-cut structure set 350 is disposed in the second mix zone 40, wherein the smaller average angle value of the fifth V-cut structure set 350 is less than the smaller average angle value of the third V-cut structure set 330. The third parallel zone 50 is located between the second side 120 and the second mix zone 40, and the sixth V-cut structure set 360 is disposed in the third parallel zone 50, wherein the smaller average angle value of the sixth V-cut structure set 360 is less than the smaller average angle value of the fifth V-cut structure set 350.

Design Principle III

This design principle is based on the changes of the larger average angle values of the straight-striped V-cut structure sets, wherein the larger average angle value is the maximum value between the first average angle and the second average angle of the V-cut element in one straight-striped V-cut structure set. For example, if the first average angle value and the second average angle value of a certain straight-striped V-cut structure set are 3.5 degrees and 40 degrees, then the smaller average angle value is 40 degrees.

In this embodiment, the straight-striped V-cut structure sets and the arrangements of the parallel zones and mix zones are the same as those shown in the design principle II, and thus are not described again. In this design principle, the larger average angle value of the first V-cut structure set 310 is less than the larger average angle value of the second V-cut structure set 320; the larger average angle value of the first V-cut structure set 310 is less than the smaller average angle value of the third V-cut structure set 330; the larger average angle value of the third V-cut structure set 330 is less than the larger average angle value of the first V-cut structure set 310 and the larger average angle value of the fourth V-cut structure set 340; the larger average angle value of the fourth V-cut structure set 340 is less than the larger average angle value of the second V-cut structure set 320; the larger average angle value of the fifth V-cut structure set 350 is less than the larger average angle value of the third V-cut structure set 330; and the larger average angle value of the sixth V-cut structure set 360 is less than the larger average angle value of the fifth V-cut structure set 350.

Figure 4:
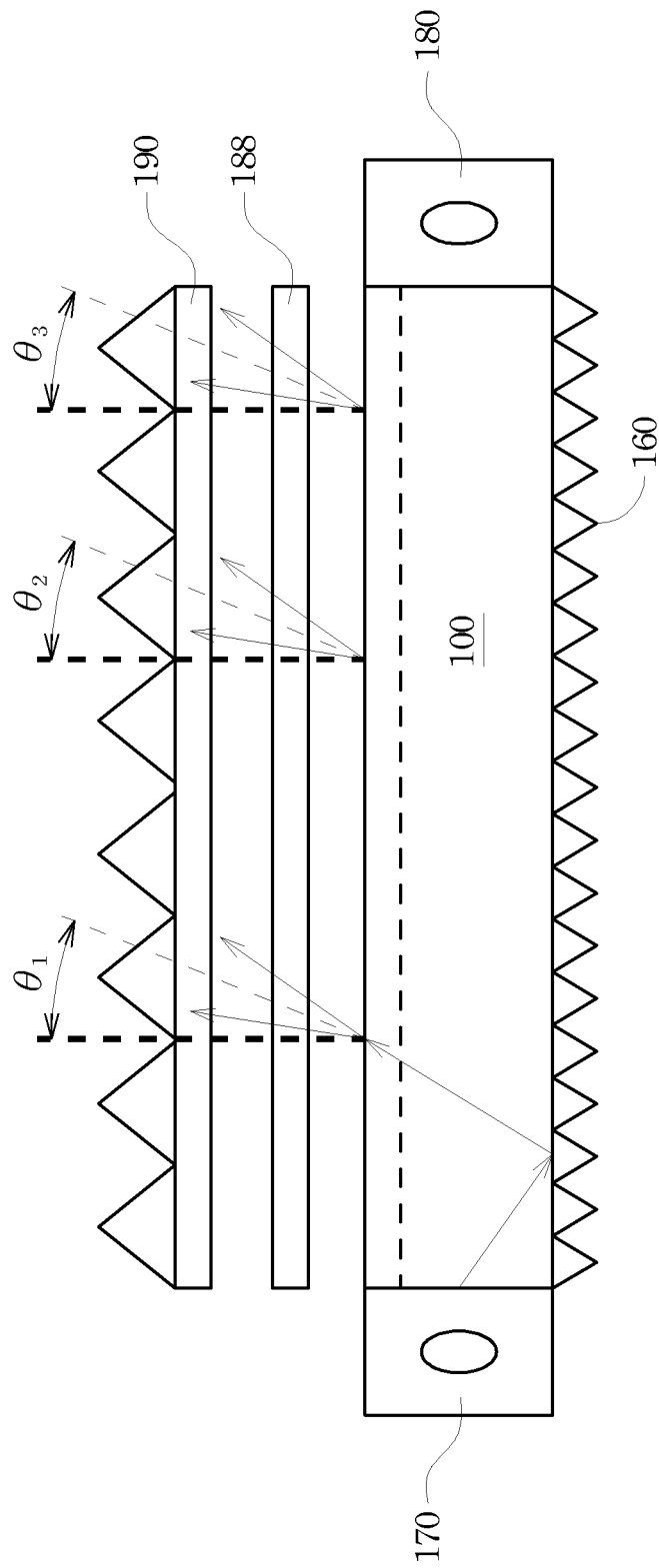
FIG. 4 is a schematic diagram showing the light patterns of the backlight module using an embodiment of the present invention.

Referring to FIG. 4, FIG. 4 is a schematic diagram showing the light patterns of the backlight module using an embodiment of the present invention. At first, the first light source 170 and/or the second light source 180 emit light to the light guide plate 100. After being reflected to a diffuser 188, the light enters the optical film 190. As shown in FIG. 4, the light incident angles $\theta_1$, $\theta_2$ and $\theta_3$ from the front, middle and end zones of the light guide plate 100 to the optical film 190 are quite close to each other, i.e., consistent light incident angles can be generated, thus satisfying the requirements of optimum light incident angles to the optical film 190. Besides, the embodiments of the present invention can further promote the output luminance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guide plate having a V-cut structure, comprising:
a base plate having a first side and a second side opposite to the first side, wherein the first side is a first light-entering side; and
a plurality of straight-striped V-cut structure sets directly formed on a surface of the base plate adjacent to the first side, wherein each of the straight-striped V-cut structure sets is composed of at least one V-cut element;
each of the at least one V-cut element having a first base angle and a second base angle formed between its respective two inclined surfaces and a horizontal surface of the base plate, wherein the first base angle is located closer to the first side than the second base angle is, and the first base angle is smaller than or equal to the second base angle; and
each of the straight-striped V-cut structure sets having a first average angle value and a second average angle value, wherein the first average angle value is an averaged value of the at least one first base angle in the each of the straight-striped V-cut structure sets, and the second average angle value is an averaged value of the at least one second base angle in the each of the straight-striped V-cut structure sets, and the second average angle values of the straight-striped V-cut structure sets are gradually decreased from the first side to a central position of the base plate,
wherein when the first side is the only one light-entering side of the light guide plate, the first average angle values of the straight-striped V-cut structure sets are the same, and the second average angle values of the straight-striped V-cut structure sets are gradually decreased from the central position to the second side.

2. The light guide plate as claimed in claim 1, wherein, when the second side is a second light-entering side of the light guide plate having V-cut structure, the first base angle is equal to the second base angle, and the second average angle values of the straight-striped V-cut structure sets are gradually increased from the central position to the second side of the base plate.

3. The light guide plate as claimed in claim 2, wherein each of two of the straight-striped V-cut structure sets adjoining the first light-entering side and the second light-entering side is composed of at least one first V-cut element belonging to the at least one V-cut element; and
one of the straight-striped V-cut structure sets located at the central position is composed of at least one second V-cut element belonging to the at least one V-cut element, and the second base angle of the first V-cut element is greater than the second base angle of the second V-cut element; and
each of remaining ones of the straight-striped V-cut structure sets is composed of a combination of the at least one first V-cut element and the at least one second V-cut element.

4. The light guide plate as claimed in claim 3, wherein the at least one first V-cut element and the at least one second V-cut element are alternately disposed in each of the remaining ones of the straight-striped V-cut structure sets.

5. The light guide plate as claimed in claim 2, wherein the second base angle is substantially in a range of 30 degrees to 45 degrees.

6. The light guide plate as claimed in claim 1, wherein one of the straight-striped V-cut structure sets adjoining the first side is composed of at least one first V-cut element belonging to the at least one V-cut element;
one of the straight-striped V-cut structure sets adjoining the second side is composed of at least one second V-cut element belonging to the at least one V-cut element; and
each of remaining ones of the straight-striped V-cut structure sets is composed of a combination of the at least one first V-cut element and the at least one second V-cut element.

7. The light guide plate as claimed in claim 6, wherein the at least one first V-cut element and the at least one second V-cut element are alternately disposed in each of the remaining ones of the straight-striped V-cut structure sets.

8. The light guide plate as claimed in claim 1, wherein the first base angle is substantially in a range of 2 degrees to 8 degrees.

9. The light guide plate as claimed in claim 1, wherein the second base angle is substantially in a range of 30 degrees to 45 degrees.

10. The light guide plate as claimed in claim 1, wherein the straight-striped V-cut structure sets are formed on a light-emitting surface of the base plate.

11. The light guide plate as claimed in claim 1, wherein the straight-striped V-cut structure sets are formed on a surface of the base plate opposite to a light-emitting surface of the base plate.

12. A light guide plate having a V-cut structure, comprising:
a base plate having a first side and a second side opposite to the first side, wherein the first side is a first light-entering side; and
a plurality of straight-striped V-cut structure sets directly formed on a surface of the base plate adjacent to the first side, wherein each of the straight-striped V-cut structure sets is composed of at least one V-cut element;
each of the at least one V-cut element having a first base angle and a second base angle formed between its respective two inclined surfaces and a horizontal surface of the base plate, wherein the first base angle is located closer to the first side than the second base angle is, and the first base angle is smaller than or equal to the second base angle; and
each of the straight-striped V-cut structure sets having a first average angle value, a second average angle value and a smaller average angle value, wherein the first average angle value is an averaged value of the at least one first base angle in the each of the straight-striped V-cut structure sets, and the second average angle value is an averaged value of the at least one second base angle in the each of the straight-striped V-cut structure sets, and the smaller average angle value is the minimum value between the first average angle and the second average angle, the straight-striped V-cut structure sets comprising:
a first V-cut structure set parallel to the first side; and
a second V-cut structure set located between the first side and the first V-cut structure set, wherein the smaller average angle value of the first V-cut structure set is less than the smaller average angle value of the second V-cut structure set.

13. The light guide plate as claimed in claim 12, wherein the straight-striped V-cut structure sets further comprises:
a third V-cut structure set, wherein the first V-cut structure set is located between the third V-cut structure set and the second V-cut structure set, and the smaller average angle value of the first V-cut structure set is less than the smaller average angle value of the third V-cut structure set.

14. The light guide plate as claimed in claim 13, wherein the base plate has a first mix zone and a first parallel zone arranged thereon, and the first parallel zone is located between the first side and the first mix zone, and the second V-cut structure set is disposed in the first parallel zone, and the first V-cut structure set is disposed in the first mix zone, the straight-striped V-cut structure sets further comprises:
a fourth V-cut structure set disposed in the first mix zone, wherein the smaller average angle value of the fourth V-cut structure set is less than the smaller average angle value of the first V-cut structure set, and the fourth V-cut structure set and the first V-cut structure set are alternately disposed.

15. The light guide plate as claimed in claim 14, wherein the base plate further has a second parallel zone arranged thereon, and the third V-cut structure set is disposed in the second parallel zone, and the first V-cut structure set is disposed in the first mix zone, and the smaller average angle value of the third V-cut structure set is less than the smaller average angle value of the first V-cut structure set and the smaller average angle value of the fourth V-cut structure set.

16. The light guide plate as claimed in claim 15, wherein the base plate further has a second mix zone arranged thereon, and the second mix zone is located between the second side and the second parallel zone, the straight-striped V-cut structure sets further comprises:
    a fifth V-cut structure set disposed in the second mix zone, wherein the smaller average angle value of the fifth V-cut structure set is less than the smaller average angle value of the third V-cut structure set.

17. The light guide plate as claimed in claim 16, wherein the base plate further has a third parallel zone arranged thereon, and the third parallel zone is located between the second side and the second mix zone, the straight-striped V-cut structure sets further comprises:
    a sixth V-cut structure set disposed in the third parallel zone, wherein the smaller average angle value of the sixth V-cut structure set is less than the smaller average angle value of the fifth V-cut structure set.

18. The light guide plate as claimed in claim 12, wherein the second side of the base plate is a second light-entering side.

19. A light guide plate having a V-cut structure, comprising:
    a base plate having a first side and a second side opposite to the first side, wherein the first side is a first light-entering side; and
    a plurality of straight-striped V-cut structure sets directly formed on a surface of the base plate adjacent to the first side, wherein each of the straight-striped V-cut structure sets is composed of at least one V-cut element;
    each of the at least one V-cut element having a first base angle and a second base angle formed between its respective two inclined surfaces and a horizontal surface of the base plate, wherein the first base angle is located closer to the first side than the second base angle is; and
    each of the straight-striped V-cut structure sets having a first average angle value, a second average angle value and a larger average angle value, wherein the first average angle value is an averaged value of the at least one first base angle in the each of the straight-striped V-cut structure sets, and the second average angle value is an averaged value of the at least one second base angle in the each of the straight-striped V-cut structure sets, and the larger average angle value is the maximum value between the first average angle and the second average angle, the straight-striped V-cut structure sets comprising:
    a first V-cut structure set parallel to the first side; and
    a second V-cut structure set located between the first side and the first V-cut structure set, wherein the larger average angle value of the first V-cut structure set is less than the larger average angle value of the second V-cut structure set;
    a third V-cut structure set, wherein the first V-cut structure set is located between the third V-cut structure set and the second V-cut structure set, and the larger average angle value of the first V-cut structure set is less than the smaller average angle value of the third V-cut structure set.

20. The light guide plate as claimed in claim 19, wherein the base plate has a first mix zone and a first parallel zone arranged thereon, and the first parallel zone is located between the first side and the first mix zone, and the second V-cut structure set is disposed in the first parallel zone, and the first V-cut structure set is disposed in the first mix zone, the straight-striped V-cut structure sets further comprises:
    a fourth V-cut structure set disposed in the first mix zone, wherein the larger average angle value of the fourth V-cut structure set is less than the larger average angle value of the second V-cut structure set, and the fourth V-cut structure set and the first V-cut structure set are alternately disposed.

21. The light guide plate as claimed in claim 20, wherein the base plate further has a second parallel zone arranged thereon, and the third V-cut structure set is disposed in the second parallel zone, and the first V-cut structure set is disposed in the first mix zone, and the larger average angle value of the third V-cut structure set is less than the larger average angle value of the first V-cut structure set and the larger average angle value of the fourth V-cut structure set.

22. The light guide plate as claimed in claim 21, wherein the base plate further has a second mix zone arranged thereon, and the second mix zone is located between the second side and the second parallel zone, the straight-striped V-cut structure sets further comprises:
    a fifth V-cut structure set disposed in the second mix zone, wherein the larger average angle value of the fifth V-cut structure set is less than the larger average angle value of the third V-cut structure set.

23. The light guide plate as claimed in claim 22, wherein the base plate further has a third parallel zone arranged thereon, and the third parallel zone is located between the second side and the second mix zone, the straight-striped V-cut structure sets further comprises:
    a sixth V-cut structure set disposed in the third parallel zone, wherein the larger average angle value of the sixth V-cut structure set is less than the larger average angle value of the fifth V-cut structure set.

24. The light guide plate as claimed in claim 19, wherein the second side of the base plate is a second light-entering side.

25. A backlight module, comprising:
    a light guide plate having a V-cut structure comprising:
    a base plate having a first side and a second side opposite to the first side, wherein the first side is a first light-entering side; and
    a plurality of straight-striped V-cut structure sets directly formed on a surface of the base plate adjacent to the first side, wherein each of the straight-striped V-cut structure sets is composed of at least one V-cut element;
    each of the at least one V-cut element having a first base angle and a second base angle formed between its respective two inclined surfaces and a horizontal surface of the base plate, wherein the first base angle is located closer to the first side than the second base angle is, and the first base angle is smaller than or equal to the second base angle; and
    each of the straight-striped V-cut structure sets having a first average angle value and a second average angle value, wherein the first average angle value is an averaged value of the at least one first base angle in the each of the straight-striped V-cut structure sets, and the second average angle value is an averaged value of the at least one second base angle in the each of the straight-striped V-cut structure sets, and the second average angle values of the straight-striped V-cut structure sets are gradually decreased from the first side to a central position of the base plate,
    wherein when the first side is the only one light-entering side of the light guide plate, the first average angle values of the straight-striped V-cut structure sets are the same, and the second average angle values of the straight-striped V-cut structure sets are gradually decreased from the central position to the second side;
    an optical film disposed above a light-emitting surface of the light guide plate; and a first light source disposed adjacent to the first side of the light guide plate.

26. The backlight module as claimed in claim 25, further comprising:
a second light source disposed adjacent to the second side of the light guide plate.

27. A light guide plate having a V-cut structure, comprising:
a base plate having a first side and a second side opposite to the first side, wherein the first side is a first light-entering side; and
a plurality of straight-striped V-cut structure sets directly formed on a surface of the base plate adjacent to the first side, wherein each of the straight-striped V-cut structure sets is composed of at least one V-cut element;
each of the at least one V-cut element having a first base angle and a second base angle formed between its respective two inclined surfaces and a horizontal surface of the base plate, wherein the first base angle is located closer to the first side than the second base angle is, and the first base angle is smaller than or equal to the second base angle; and
each of the straight-striped V-cut structure sets having a first average angle value and a second average angle value, wherein the first average angle value is an averaged value of the at least one first base angle in the each of the straight-striped V-cut structure sets, and the second average angle value is an averaged value of the at least one second base angle in the each of the straight-striped V-cut structure sets, and the second average angle values of the straight-striped V-cut structure sets are gradually decreased from the first side to a central position of the base plate,
wherein, when the first side is the only one light-entering side of the light guide plate, the first average angle values of the straight-striped V-cut structure sets are the same from the first side to the central position and then are gradually decreased from the central position to the second side; and the second average angle values of the straight-striped V-cut structure sets are gradually increased from the central position to the second side.

28. The light guide plate as claimed in claim 27, wherein, when the second side is a second light-entering side of the light guide plate having V-cut structure, the first base angle is equal to the second base angle, and the second average angle values of the straight-striped V-cut structure sets are gradually increased from the central position to the second side of the base plate.

29. The light guide plate as claimed in claim 28, wherein each of two of the straight-striped V-cut structure sets adjoining the first light-entering side and the second light-entering side is composed of at least one first V-cut element belonging to the at least one V-cut element; and
one of the straight-striped V-cut structure sets located at the central position is composed of at least one second V-cut element belonging to the at least one V-cut element, and the second base angle of the first V-cut element is greater than the second base angle of the second V-cut element; and
each of remaining ones of the straight-striped V-cut structure sets is composed of a combination of the at least one first V-cut element and the at least one second V-cut element.

30. The light guide plate as claimed in claim 29, wherein the at least one first V-cut element and the at least one second V-cut element are alternately disposed in each of the remaining ones of the straight-striped V-cut structure sets.

31. The light guide plate as claimed in claim 28, wherein the second base angle is substantially in a range of 30 degrees to 45 degrees.

32. The light guide plate as claimed in claim 27, wherein one of the straight-striped V-cut structure sets adjoining the first side is composed of at least one first V-cut element belonging to the at least one V-cut element;
one of the straight-striped V-cut structure sets located at the central position is composed of at least one second V-cut element belonging to the at least one V-cut element, and the second base angle of the at least one first V-cut element is greater than the second base angle of the at least one second V-cut element, and the first base angle of the at least one first V-cut element is equal to the first base angle of the at least one second V-cut element;
one of the straight-striped V-cut structure sets adjoining the second side is composed of at least one third V-cut element belonging to the at least one V-cut element, and the second base angle of the at least one second V-cut element is smaller than the second base angle of the at least one third V-cut element, and the first base angle of the at least one second V-cut element is greater than the first base angle of the at least one third V-cut element;
at least one of the straight-striped V-cut structure sets located between the first side and the central position is composed of a combination of the at least one first V-cut element and the at least one second V-cut element; and
at least one of the straight-striped V-cut structure sets located between the central position and the second side is composed of a combination of the at least one second V-cut element and the at least one third V-cut element.

33. The light guide plate as claimed in claim 32, wherein the at least one first V-cut element and the at least one second V-cut element are alternately disposed in at least one of the straight-striped V-cut structure sets located between the first side and the central position; and the at least one second V-cut element and the at least one third V-cut element are alternately disposed in at least one of the straight-striped V-cut structure sets located between the central position and the second side.

34. The light guide plate as claimed in claim 27, wherein the first base angle is substantially in a range of 2 degrees to 8 degrees.

35. The light guide plate as claimed in claim 27, wherein the second base angle is substantially in a range of 30 degrees to 45 degrees.

36. The light guide plate as claimed in claim 27, wherein the straight-striped V-cut structure sets are formed on a light-emitting surface of the base plate.

37. A backlight module, comprising:
a light guide plate having a V-cut structure comprising:
a base plate having a first side and a second side opposite to the first side, wherein the first side is a first light-entering side; and
a plurality of straight-striped V-cut structure sets directly formed on a surface of the base plate adjacent to the first side, wherein each of the straight-striped V-cut structure sets is composed of at least one V-cut element;
each of the at least one V-cut element having a first base angle and a second base angle formed between its respective two inclined surfaces and a horizontal surface of the base plate, wherein the first base angle is located closer to the first side than the second base angle is, and the first base angle is smaller than or equal to the second base angle; and
each of the straight-striped V-cut structure sets having a first average angle value and a second average angle value, wherein the first average angle value is an averaged value of the at least one first base angle in the each of the straight-striped V-cut structure sets, and the second average angle value is an averaged value of the at least one second base angle in the each of the straight-striped V-cut structure sets, and the second average angle values of the straight-striped V-cut structure sets are gradually decreased from the first side to a central position of the base plate, wherein, when the first side is the only one light-entering side of the light guide plate, the first average angle values of the straight-striped V-cut structure sets are the same from the first side to the central position and then are gradually decreased from the central position to the second side; and the second average angle values of the straight-striped V-cut structure sets are gradually increased from the central position to the second side;

an optical film disposed above a light-emitting surface of the light guide plate; and a first light source disposed adjacent to the first side of the light guide plate.

38. The backlight module as claimed in claim 37, further comprising:

a second light source disposed adjacent to the second side of the light guide plate.

* * * * *